Figure 1:
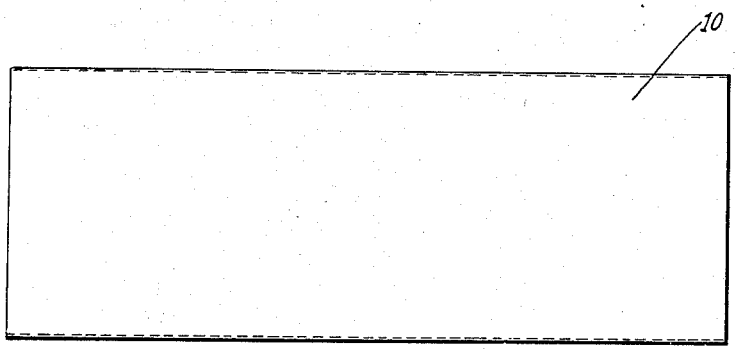

Sept. 18, 1945.   C. J. CAVALLITO   2,385,257
PACKAGING
Filed March 26, 1942

Inventor
Chester J. Cavallito
By
Attorney

Patented Sept. 18, 1945

2,385,257

UNITED STATES PATENT OFFICE 2,385,257

PACKAGING

Chester J. Cavallito, Rensselaer, N. Y., assignor to Wingfoot Corporation, Akron, Ohio, a corporation of Delaware Application March 26, 1942, Serial No. 436,323

2 Claims. (Cl. 99—174)

This invention relates to a new method of packaging a meatloaf or similar article. The package is formed from a rubber hydrochloride film which has been stretched a small amount at a low temperature, and which, then after the package has been formed, has been heated to a low temperature to cause the rubber hydrochloride film to shrink.

The stretched rubber hydrochloride film on the market has been stretched at a high temperature, and it is necessary to heat it to a high temperature in order to cause it to shrink. The commercial unstretched rubber hydrochloride films (i. e., all grades of Pliofilm unstretched film) are made by casting a cement of rubber hydrochloride on a belt, evaporating some of the solvent from the cement while the film is on the belt, and then evaporating the balance of the solvent after removing the film from the belt and while the film is held in an extended condition. This evaporation takes place at a high temperature. If the film made in this way is later heated to a sufficiently high temperature, some shrinkage will occur. No shrinkage will occur at low temperatures.

It is the object of this invention to cold-stretch a rubber hydrochloride film, i. e., stretch it at a low temperature, for example, a temperature of 140–160° F., and to use this in packaging meatloaves and the like, and heat the film after packaging to cause it to shrink and cling to the package. The film may be stretched in one or both directions. It may be stretched, for example, 25 to 50% of its original size. As it is difficult to cold-stretch an unelasticized (unplasticized) film, the invention is applicable to films which contain an elasticizer, such as two or three or more per cent of butyl stearate or dibutyl phthalate, etc. It may, for example, contain ten per cent of dibutyl sebacate.

In certain industries there is a demand for tight-fitting, transparent wrappers. The pronounced example of this is the meatloaf industry. The meatloaf manufacturers demand a transparent wrapper and also a wrapper which gives snug fit to the irregular surface of the meatloaf. Unless the wrapper fits snugly the air pockets between the wrapper and the meatloaf blur the image of the meatloaf through the wrapper. A meatloaf which is packaged in a skin-tight, transparent wrapper is much more attractive and has a much greater sales appeal than when wrapped in a wrapper which does not form a skin-tight enclosure.

In applying the invention to a meatloaf the elasticized rubber hydrochloride film is heated to a temperature of, for example, 140–160° F., and then stretched lengthwise by being fed at a given rate between stretching rolls which travel at a surface speed 25–50% greater than the rate at which the film is fed to the rolls. This film is then preferably passed continuously over a broad knife which cuts off transverse strips slightly wider than what is required to encircle the meatloaf. The edges of these strips are then brought together and heat-sealed by applying heat and pressure thereto to form tubes which are slightly larger in circumference than the circumference of the meatloaves. The grain in the film, produced by stretching, runs circumferentially in the tubes.

The loaves are then fed into these tubes, and the tubes are then heated to a low temperature to cause it to shrink. By heating to the temperature at which the film was stretched, the film will contract. It contracts circumferentially and produces a skin-tight fit. The meatloaf is clearly visible through the transparent film which in this way is stretched taut over the meatloaf. The ends of the tube are folded over or twisted in any suitable way to form any desired type of closure.

Although any low temperature may be used for stretching and for subsequent shrinkage, a temperature of about 157° F. has been used and found satisfactory. The high temperature required for shrinking the ordinary commercial stretched film, which has been stretched at a high temperature around 200° F. or higher, is not satisfactory for shrinking the film after the meatloaf has been put in it.

The low temperature required for shrinking the film which has been stretched at a low temperature may easily be supplied by blowing the film with heated air. The film may quickly be raised to the temperature required for shrinking by blowing with heated air or by passing through a heated compartment.

Figure 2:
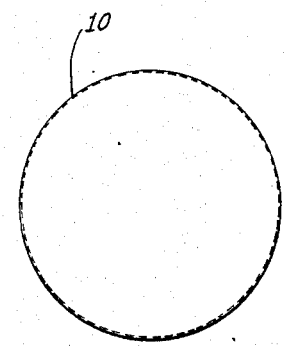
Figure 3:
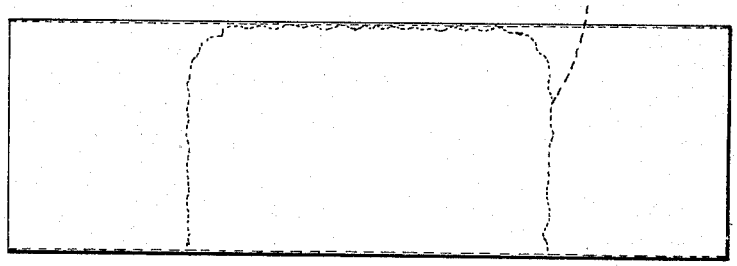
Figure 4:
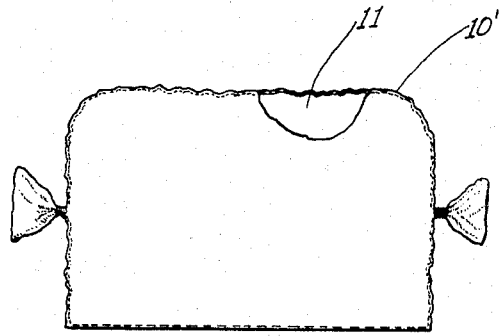

The invention is further illustrated by reference to the attached drawing in which Figs 1 and 2 show a side view and end view of a cylinder of the film. Fig. 3 shows a side view of a cylinder of the film with the meatloaf inside of it, and Fig. 4 is a side view of the finished meatloaf. In the drawing the film is indicated by the reference numeral 10. The first two figures show different views of this cylinder. In Fig. 3 the meatloaf 11 has been inserted in the cylinder as above described. The cylinder is then heated to shrink it, and the ends are twisted to make a tight closure. On heating, the film is made to conform closely to the shape of the meatloaf. This is best represented in Fig. 4, where the film is indicated by the reference numeral 10'.

What I claim is:

1. The method of packaging a meatloaf which comprises enclosing the meatloaf in a tube of elasticized rubber hydrochloride film which has been stretched circumferentially only at a temperature no greater than 160° F. and has been cooled to set the film in the stretched condition, and then heating the tube to a temperature not substantially greater than that used in stretching in order to cause the film to shrink circumferentially and form a skin-tight enclosure around the meatloaf.

2. The method of packaging a meatloaf which comprises heating a plasticized rubber hydrochloride film to a temperature no greater than 160° F., stretching the film so heated continuously by feeding it at a given speed to stretching rollers which have a greater surface speed by at least 25%, allowing the film to cool in the stretched condition so as to be set-stretched, cutting strips of the film transversely from the stretched sheet with the grain produced by stretching running across the strips and forming these into tubes by uniting the edges thereof, inserting a meatloaf in the tubes thus formed, and thereafter heating the tubes to a temperature not substantially greater than that used in stretching the film to thereby cause the film to shrink skin-tight around the meatloaf.

CHESTER J. CAVALLITO.